(12) United States Patent
Johnston et al.

(10) Patent No.: US 11,287,829 B2
(45) Date of Patent: Mar. 29, 2022

(54) ENVIRONMENT MAPPING FOR AUTONOMOUS VEHICLES USING VIDEO STREAM SHARING

(71) Applicant: Cisco Technology, Inc., San Jose, CA (US)

(72) Inventors: Jay Kemper Johnston, Raleigh, NC (US); Magnus Mortensen, Cary, NC (US); Kevin Klous, Raleigh, NC (US); David C. White, Jr., St. Petersburg, FL (US)

(73) Assignee: Cisco Technology, Inc., San Jose, CA (US)

( * ) Notice: Subject to any disclaimer, the term of this patent is extended or adjusted under 35 U.S.C. 154(b) by 242 days.

(21) Appl. No.: 16/446,804

(22) Filed: Jun. 20, 2019

(65) Prior Publication Data

US 2020/0401157 A1     Dec. 24, 2020

(51) Int. Cl.
*G05D 1/02*     (2020.01)
*G05D 1/00*     (2006.01)
(Continued)

(52) U.S. Cl.
CPC ......... *G05D 1/0246* (2013.01); *B64C 39/024* (2013.01); *G05D 1/0022* (2013.01);
(Continued)

(58) Field of Classification Search
CPC .. G05D 1/0246; G05D 1/0022; G05D 1/0088; G05D 1/0214; G05D 1/0285;
(Continued)

(56) References Cited

U.S. PATENT DOCUMENTS 10,008,116 B1 *  6/2018  Sandbrook ............. G08G 1/143
10,859,383 B2 * 12/2020  Beaurepaire ........... G01C 21/28
(Continued)

FOREIGN PATENT DOCUMENTS

WO   WO 2020205597 A1 *  3/2020  ............ B60W 60/00
WO   WO-2020205597 A1 * 10/2020  ............ B60W 60/00

OTHER PUBLICATIONS

Harald Haas, "LiFi is a Paradigm-shifting 5g Technology", 2018, Reviews in Physics 3, pp. 26-27 (first and second page) (Year: 2018).*

(Continued)

*Primary Examiner* — Peter D Nolan
*Assistant Examiner* — Kenneth M Dunne
(74) *Attorney, Agent, or Firm* — Behmke Innovation Group; James J. Wong; Jonathon P. Western

(57) ABSTRACT

In one embodiment, a supervisory service of a parking area may send a light fidelity (Li-Fi) based advertisement indicative of an offer to send video streams of the parking area to an autonomous vehicle. The supervisory service may receive an acceptance of the offer by the autonomous vehicle that includes an identifier for the autonomous vehicle. The supervisory service may identify one or more video streams of the parking area as associated with the autonomous vehicle based in part on a location of the autonomous vehicle in the parking area. The supervisory service may annotate the one or more identified video streams with metadata regarding a feature of the parking area. The supervisory service may send the annotated one or more video streams to the autonomous vehicle, wherein the autonomous vehicle uses the metadata of the annotated one or more video streams to avoid the feature of the parking area.

20 Claims, 8 Drawing Sheets

(51) Int. Cl.
  *B64C 39/02* (2006.01)
  *G08G 1/14* (2006.01)
(52) U.S. Cl.
  CPC ......... *G05D 1/0088* (2013.01); *G05D 1/0214* (2013.01); *G05D 1/0285* (2013.01); *G08G 1/142* (2013.01); *B64C 2201/127* (2013.01); *G05D 2201/0213* (2013.01)
(58) Field of Classification Search
  CPC .......... G05D 2201/0213; B64C 39/024; B64C 2201/127; G08G 1/142; G08G 1/14
  See application file for complete search history.

(56) References Cited

U.S. PATENT DOCUMENTS

| | | | | |
|---|---|---|---|---|
| 2018/0190117 | A1* | 7/2018 | Longardner | G08G 1/144 |
| 2018/0268617 | A1* | 9/2018 | Bruce | G08G 1/142 |
| 2018/0359320 | A1* | 12/2018 | Latheef | H04B 10/516 |
| 2019/0066503 | A1* | 2/2019 | Li | G08G 5/045 |
| 2019/0196499 | A1* | 6/2019 | Paden | G05D 1/0282 |
| 2019/0204825 | A1* | 7/2019 | Golgiri | B60W 30/06 |
| 2019/0268072 | A1* | 8/2019 | Aoyama | H04B 10/1141 |
| 2019/0303982 | A1* | 10/2019 | Michel | G06K 9/00637 |
| 2020/0099447 | A1* | 3/2020 | Murakami | H04B 10/114 |
| 2020/0133261 | A1* | 4/2020 | Tao | G06F 21/32 |
| 2020/0175284 | A1* | 6/2020 | Viswanathan | G06F 16/29 |
| 2020/0389761 | A1* | 12/2020 | Rao | G08G 1/143 |

OTHER PUBLICATIONS

Lewin, Sarah, "LEDs Bring New Ligh to Car-to-Car Communication", IEEE Spectrum, Aug. 20, 2014, 1 page.
Balasundaram, Abinayaa, "Visible Light Communication based smart parking system using MSP430" Journal of Engineering and Applied Sciences, 11, 2016, pp. 1337-1342.
Schwab, Katharine, "Why Your Autonomous Car Might Come With Its Own Drone", Fast Company, https://www.fastcompany.com/90162582/why-your-autonomous-car-might-come-with-its-own-drone, Mar. 2, 2018, 6 pages.
"Smart Parking Lot Using Quadcopter Network", online: https://www.uasvislon.com/2015/03/18/smart-parking-lot-using-quadcopter-network/, dated Mar. 18, 2015, printed Oct. 25, 2019, 1 page, UAS Vision.
Stubbs et al., "A Real-Time Collision Warning System for Intersections", Semantics Scholar, 2003, 16 pages.
Veen, Chad Vander, "Drone Assisted Parking", Government Technology, Jan. 20, 2015, 5 pages.
"Valeo and Cisco Innovate for Smart Parking Service" online: https://www.valeo.com/en/valeo-and-cisco-innovate-for-smart-parking-service/, printed Jan. 14, 2019, 1 page.
Saxena et al., "Multiagent Sensor Fusion for Connected & Autonomous Vehicles to Enhance Navigation Safety", The Robotics Institute, Carnegie Mellon University, 2018, 13 pages.
Jun et al., "Infrastructure-Based Sensors Augmenting Efficient Autonomous Vehicle Operations", Intelligent Transporation Systems World Congress, 2014, National Renewable Energy Laboratory, 6 pages.

* cited by examiner

ENVIRONMENT MAPPING FOR AUTONOMOUS VEHICLES USING VIDEO STREAM SHARING

TECHNICAL FIELD

The present disclosure relates generally to computer networks, and, more particularly, to environment mapping for autonomous vehicles using video stream sharing.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, to route the vehicles to their destinations and avoid roadway hazards. Trials of autonomous vehicles are now being conducted in many cities.

In areas of relatively high visibility like highways or streets, vehicles may operate autonomously (or semi-autonomously). However, navigation abilities of autonomous vehicles are limited in areas that pose numerous "blind spots" for onboard sensors (e.g., motion, video, etc.) of the autonomous vehicles. For example, parking areas (e.g., a parking lot) present significant challenges for autonomous vehicles in that navigation in parking areas is constrained (i.e. "tight") and there are both fixed obstacles (e.g., other parked vehicles, pillars, guard rails, etc.) as well as dynamic or unpredictable obstacles (e.g., people, animals, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
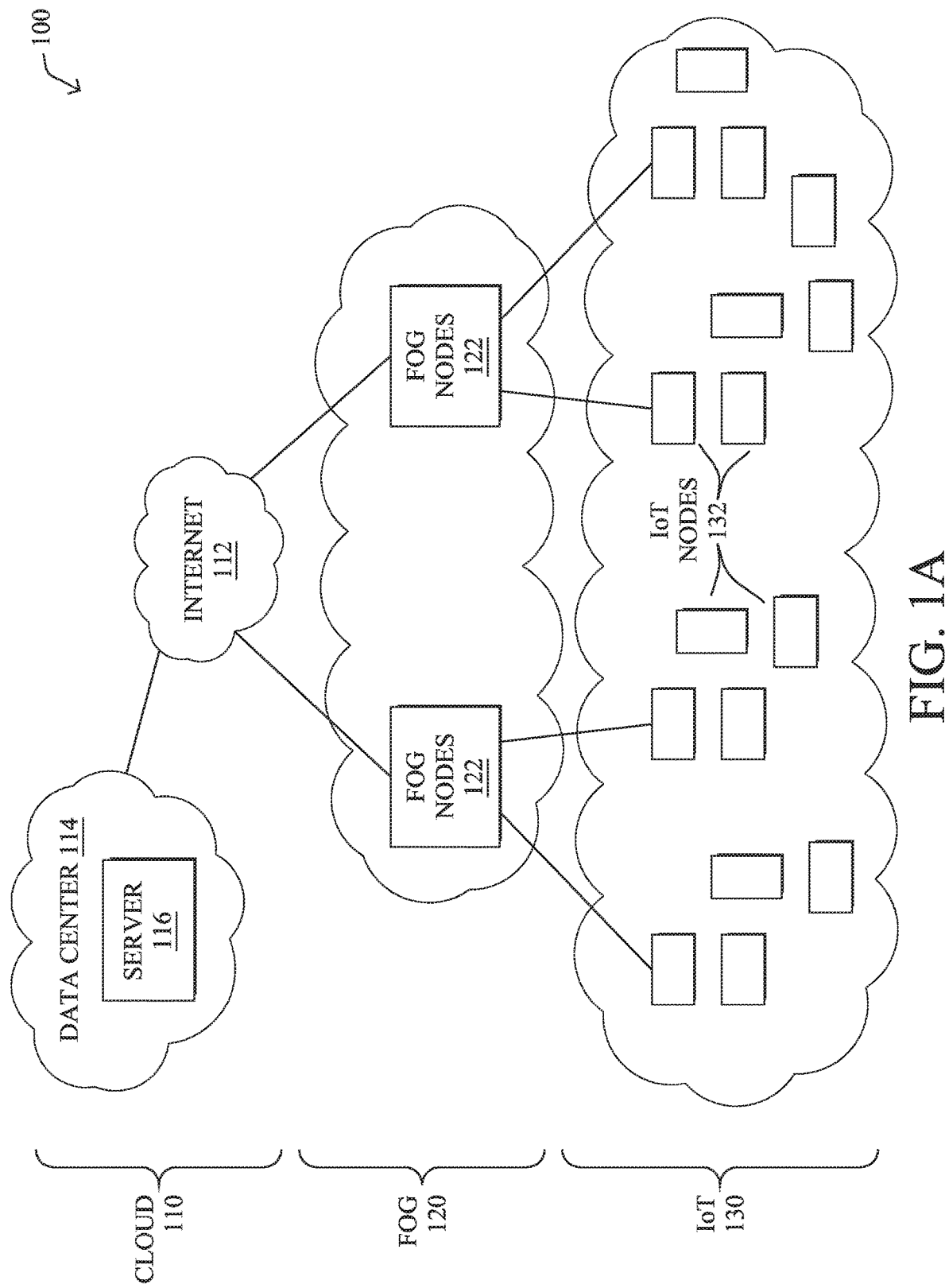
FIGS. 1A-1B illustrate an example communication network.

According to one or more embodiments of the disclosure, techniques herein provide for environment mapping for autonomous vehicles using video stream sharing is provided. A supervisory service of a parking area may send a light fidelity (Li-Fi) based advertisement indicative of an offer by the supervisory service to send video streams of the parking area to an autonomous vehicle. The supervisory service may receive an acceptance of the offer by the autonomous vehicle that includes an identifier for the autonomous vehicle. The supervisory service may identify one or more video streams of the parking area as associated with the autonomous vehicle based in part on a location of the autonomous vehicle in the parking area. The supervisory service may annotate the one or more identified video streams with metadata regarding a feature of the parking area. The supervisory service may send the annotated one or more video streams to the autonomous vehicle, wherein the autonomous vehicle uses the metadata of the annotated one or more video streams to avoid the feature of the parking area.

In another embodiment, an autonomous vehicle may receive a light fidelity (Li-Fi) based advertisement indicative of an offer by a supervisory service to send video streams of the parking area to the vehicle from the supervisory service. The autonomous vehicle may send an acceptance of the offer by the autonomous vehicle that includes an identifier for the autonomous vehicle. The autonomous vehicle may receive annotated one or more video streams with metadata regarding a feature of the parking area, wherein the supervisory service identifies the annotated one or more video streams based in part on a location of the autonomous vehicle in the parking area and annotates the annotated one or more video streams with metadata regarding the feature of the parking area. The autonomous vehicle may use the metadata of the annotated one or more video streams to avoid the feature of the parking area.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs) to light fidelity (Li-Fi) based communication networks. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
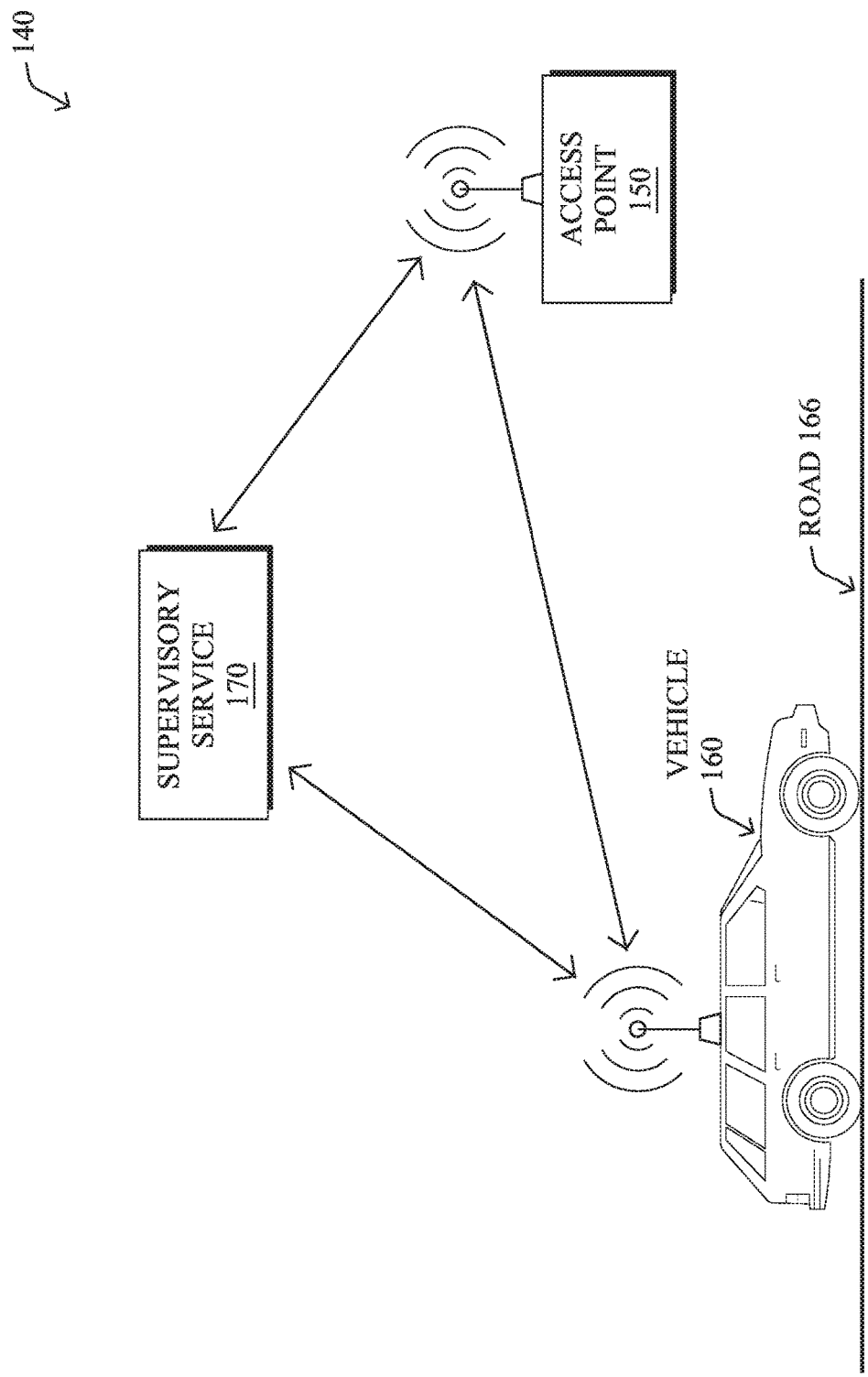

FIG. 1B illustrates an example connected vehicle system 140, according to various embodiments. In particular, connected vehicle system 140 may include any or all of the following components: a vehicle 160 on a road 166, an access point 150, and/or a remote supervisory service 170. During operation, connected vehicle system 140 may be operable to interface vehicle 160 with a backend computer network, such as the Internet, to which supervisory service 170 belongs.

In some embodiments, connected vehicle system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, access point 150 may be a fog node 122 at fog computing layer 120, while vehicle 160 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, vehicle 160 may be an automobile, motorcycle, truck, aircraft, autonomous drone, or any other type of vehicle configured to communicate via connected vehicle system 140. In some embodiments, vehicle 160 may be a fully autonomous vehicle or a semi-autonomous vehicle that allows a driver to exert control over vehicle 160, as desired.

Access point 150 may communicate with supervisory service 170 via a WAN, such as the Internet 112 or another WAN. For example, access point 150 may communicate with supervisory service 170 by leveraging a hardwired network connection, cellular or other wireless connection, satellite connection, or the like. Communications between vehicle 160 and access point 150 may generally be wireless and use any form of known wireless communication (e.g., Wi-Fi, cellular, light-based, etc.). More specifically, access point 150 may be part of a radio access network that provides wireless connectivity between a backbone network and vehicle 160.

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if vehicle 160 is an electric vehicle, processors controlling vehicle body functions, and the like. A local gateway of vehicle 160 may provide communicative connectivity between the local network of vehicle 160 and other devices.

Figure 2:
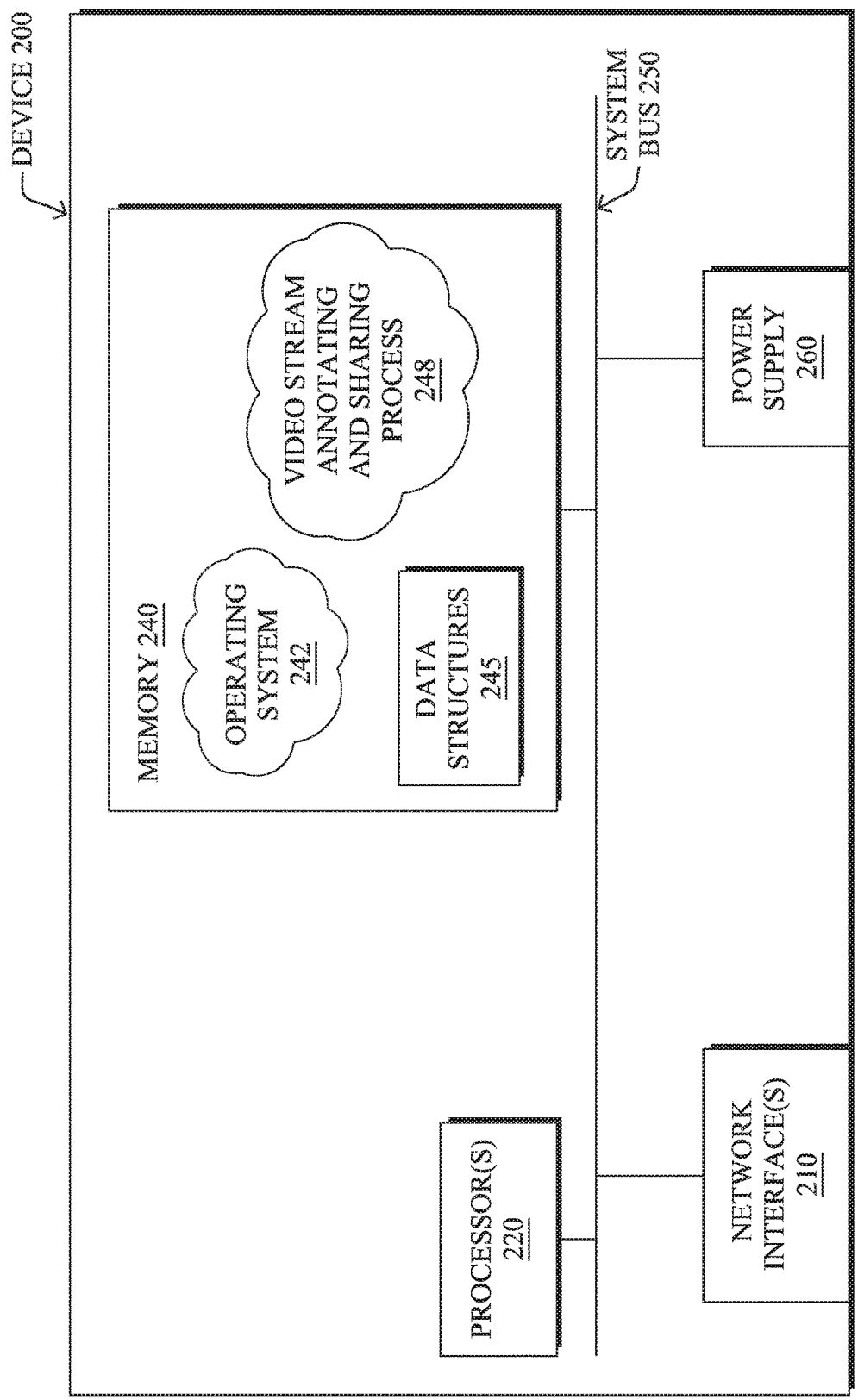
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative video stream annotating and sharing process 248, as described herein.

In general, video stream annotating and sharing process 248 may be configured to select one or more video streams to be annotated with metadata regarding a feature of a parking area and to be sent to an autonomous vehicle. In some embodiments, video stream annotating and sharing process 248 may do so by leveraging machine learning, to select the one or more video streams. In general, machine learning is concerned with the design and the development of techniques that take as input empirical data and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, video stream annotating and sharing process 248 may employ one or more supervised, unsupervised, or semi-supervised machine learning models. Generally, supervised learning entails the use of a training set of data, as noted above, that is used to train the model to apply labels to the input data. For example, the training data may include data indicative of the connectivity of the various vehicles. On the other end of the spectrum are unsupervised techniques that do not require a training set of labels. Notably, while a supervised learning model may look for previously seen patterns that have been labeled, as such, an unsupervised model may instead look to whether there are sudden changes in the behavior. Semi-supervised learning models take a middle ground approach that uses a greatly reduced set of labeled training data.

Example machine learning techniques that video stream annotating and sharing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes or operate concurrently.

As noted above, vehicles are becoming increasingly sophisticated and, in areas of relatively high visibility like highways or streets, vehicles may operate autonomously (or semi-autonomously). However, navigation abilities of autonomous vehicles are limited in areas that pose numerous "blind spots" for onboard sensors (e.g., motion, video, etc.) of the autonomous vehicles. In particular, even with several well-placed sensors on an autonomous vehicle that are used to aid in autonomously driving the vehicle, gaps in visual surveillance coverage surrounding the vehicle are present in sensor data collected by the sensors. Notably, these sensors oftentimes cannot monitor dark areas, corners, walls, etc. of crowded environments. For example, parking areas present significant challenges for autonomous vehicles in that navigation in parking areas is constrained (i.e., "tight") and there are both fixed obstacles (e.g., other parked vehicles, pillars, guard rails, etc.) as well as dynamic or unpredictable obstacles (e.g., people, animals, etc.). These obstacles may block an autonomous vehicle's lines of sight by degrading sensor input to the sensors. Given these challenges, the chance of a collision with one of these obstacles is higher in parking areas for autonomous vehicles (as compared to highways or streets).

—Environment Mapping for Autonomous Vehicles Using Video Stream Sharing—

The techniques herein allow for environment mapping for autonomous vehicles using video stream sharing. In some aspects, vehicle-to-infrastructure (V2I) communications may be leveraged to rectify "blind spots" an autonomous vehicle may experience in crowded environments (e.g., a parking area). In particular, the autonomous vehicle may quickly discover an ability of the infrastructure to share its video streams (or other sensor data), for example, in connected cities or parking garages configured to advertise that ability. The autonomous vehicle and the infrastructure may discover each other using light fidelity (Li-Fi) communications, for example, at the entrance of a multi-floored parking garage. Once the autonomous vehicle has discovered the ability of the infrastructure to share its video streams, the infrastructure may send a "bespoke" video stream (or streams), annotated with metadata indicative of a feature of the parking area (e.g., an obstacle, signage, etc.) to the autonomous vehicle. The autonomous vehicle may use the metadata to identify the feature and avoid it. It is to be understood that, in addition to autonomous vehicles, the aforementioned techniques can be used with other types of mobile devices (e.g., a drone, a cellphone, etc.) with other types of crowded environments (e.g., pedestrian malls, roof drone landing zones, etc.).

Specifically, according to one or more embodiments of the disclosure as described in detail below, a supervisory service of a parking area may send a light fidelity (Li-Fi) based advertisement indicative of an offer by the supervisory service to send video streams of the parking area to an autonomous vehicle. The supervisory service may receive an acceptance of the offer by the autonomous vehicle that includes an identifier for the autonomous vehicle. The supervisory service may identify one or more video streams of the parking area as associated with the autonomous vehicle based in part on a location of the autonomous vehicle in the parking area. The supervisory service may annotate the one or more identified video streams with metadata regarding a feature of the parking area. The supervisory service may send the annotated one or more video streams to the autonomous vehicle, wherein the autonomous vehicle uses the metadata of the annotated one or more video streams to avoid the feature of the parking area.

In another embodiment as described herein, an autonomous vehicle may receive a light fidelity (Li-Fi) based advertisement indicative of an offer by a supervisory service to send video streams of the parking area to the vehicle from the supervisory service. The autonomous vehicle may send an acceptance of the offer by the autonomous vehicle that includes an identifier for the autonomous vehicle. The autonomous vehicle may receive annotated one or more video streams with metadata regarding a feature of the parking area, wherein the supervisory service identifies the annotated one or more video streams based in part on a location of the autonomous vehicle in the parking area and annotates the annotated one or more video streams with metadata regarding the feature of the parking area. The autonomous vehicle may use the metadata of the annotated one or more video streams to avoid the feature of the parking.

Illustratively, the techniques described herein may be performed by hardware, software, and/or firmware, such as in accordance with the video stream annotating and sharing process 248, which may include computer executable instructions executed by the processor 220 (or independent processor of interfaces 210) to perform functions relating to the techniques described herein.

Figure 3:
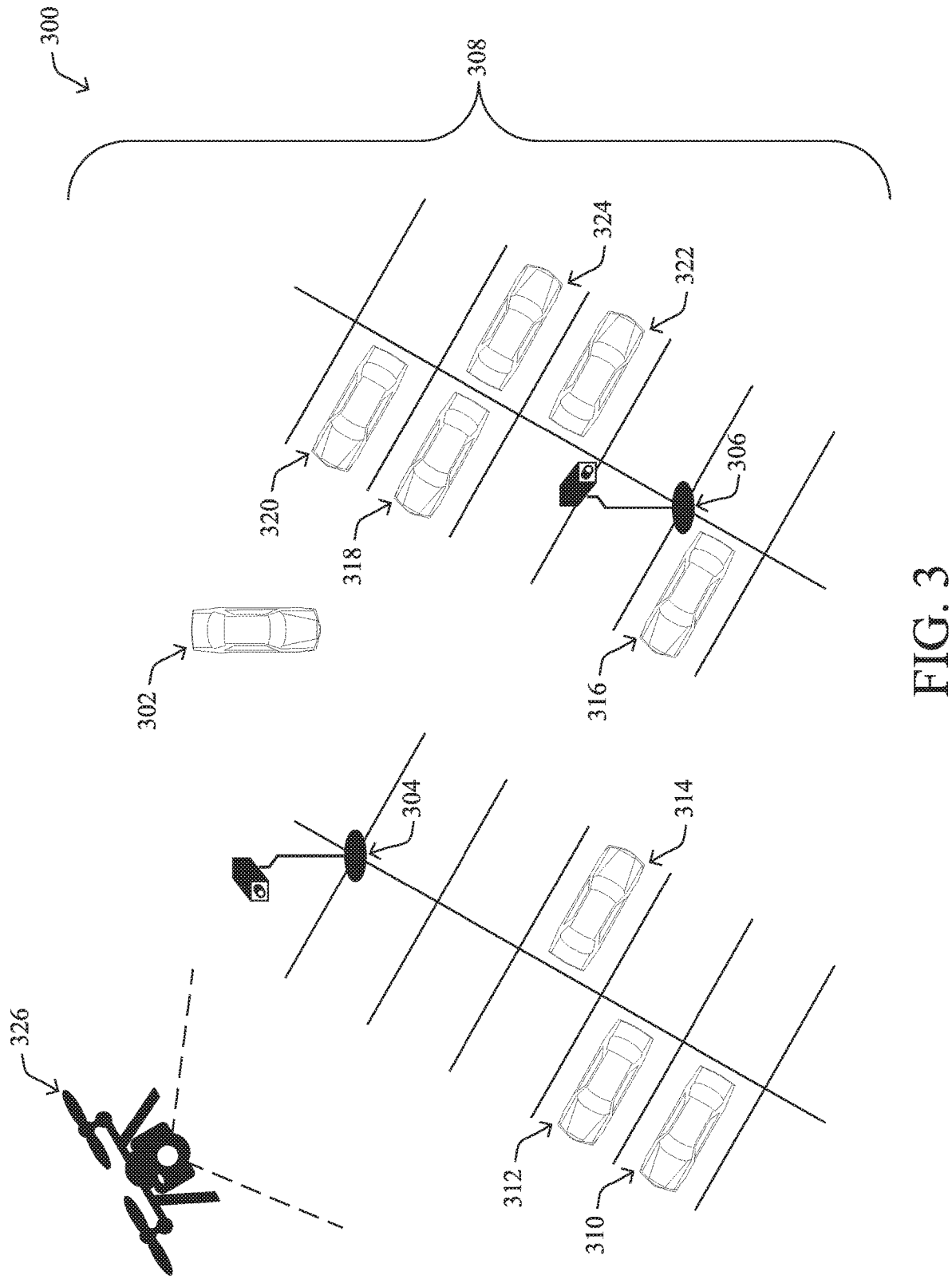
FIG. 3 illustrates an example architecture for environment mapping for autonomous vehicles using video stream sharing.

Operationally, FIG. 3 illustrates an example architecture for environment mapping for autonomous vehicles using video stream sharing. In particular, a system 300 for communication between an autonomous vehicle 302 and communications network infrastructure 304-306 of a parking area 308 is shown. The parking area 308 can comprise, a single level parking area, a multi-level parking structure, a surface lot, a drive-thru, or any other location where an autonomous vehicle may operate that present "blind spots" as described herein. Within the parking area 308, a plurality of vehicles 310-324 may be parked at respective parking spots. Further, the communications network infrastructure 304-306 may be in communication with a drone 326. Generally, the communications network infrastructure 304-306 comprises communications hardware (e.g., access points, routers, etc.) that allow for communications between with the autonomous vehicle 302 and gathering of video streams of the parking area 308 (e.g., cameras). Further, the communications network infrastructure 304-306 can be configured to execute the supervisory service 170 in accordance with video stream annotating and sharing process 248. An onboard unit of the autonomous vehicle 302 is configured to communicate with the communications network infrastructure 304-306 over a plurality of communications protocols, for example, Li-Fi, wireless fidelity (Wi-Fi), etc., over which the autonomous vehicle 302 can pair with the communications network infrastructure 304-306 and receive one or more video streams as well as metadata that is annotated to the video streams. The pairing may be accomplished using, for example, headlights of the autonomous vehicle, a Li-Fi transmitter of the autonomous vehicle, a light transmitter of the vehicle, by infrared emission of the autonomous vehicle, etc. The onboard unit of the autonomous vehicle additionally is configured to communicate with sensors that are installed within or on the autonomous vehicle 302 that allow the autonomous vehicle 302 to detect its environment (e.g., the parking area 308).

Upon entering the parking area 308, the autonomous vehicle 302 may receive a light fidelity (Li-Fi) based advertisement indicative of an offer by the supervisory service (of the communications network infrastructure 304-306 of a parking area 308) to send video streams of the parking area. In particular, at an entrance of the parking area 308, LED lighting used for Li-Fi based communications may be used, where the LED lighting advertises the video stream sharing capability of the supervisory service. The autonomous vehicle 302 can, after receiving the Li-Fi based advertisement, send an acceptance of the offer by the autonomous vehicle that includes an identifier for the autonomous vehicle. The acceptance can indicate that the autonomous vehicle 302 wishes to receive a helpful, customized video stream from the communications network infrastructure 304-306 that will aid the autonomous vehicle 302 in navigating the parking area 308. Further, the acceptance of the offer by the autonomous vehicle that includes the identifier for the autonomous vehicle can be indicated by a pattern in emission of light from headlights of the autonomous vehicle or by infrared emission of the autonomous vehicle, both of which the communications network infrastructure 304-306 is capable of receiving and decoding.

It is to be understood that using Li-Fi based communications to establish communications between the autonomous vehicle 308 and the communications network infrastructure 304-306 addresses problems posed by radiofrequency (RF) based communications (e.g., Wi-Fi). Specifically, Li-Fi based communications prevents the communications network infrastructure 304-306 from advertising its abilities to nearby devices that would not benefit from the video sharing abilities of the supervisory service. For example, a mobile device on a fourth floor of a parking structure would not benefit from receiving a video feed from a supervisory service operating on a third floor of the parking structure.

Subsequent to receiving the acceptance of the offer by the autonomous vehicle 302, the supervisory service of the communications network infrastructure 304-306 is configured to identify one or more video streams of the parking area 308 as associated with the autonomous vehicle based in part on a location of the autonomous vehicle in the parking area. In particular, the supervisory service may be configured to use the identifier of the vehicle that is included in the acceptance to locate the autonomous vehicle 302 in certain video streams or predict video streams that the autonomous vehicle 302 may appear in. Stated another way, the supervisory service may select video streams that have the "best" view or optics of the autonomous vehicle 302 and its predicted path through the structure. The supervisory service may implement a machine learning based process, described in more detail above herein, to identify the one or more video streams that the autonomous vehicle 302 appears or will appear in.

After identifying the one or more video streams of the parking area 308, the supervisory service is configured to annotate the identified one or more video streams with metadata regarding a feature of the parking area 308. The feature of the parking of the lot may comprise an obstacle that, as described above, is not readily detected (or cannot be detected) by the sensor of the autonomous vehicle 302. For example, the feature may be one of the plurality of vehicles 310-324 (or parts of the plurality of vehicles 310-324) that are parked at a respective parking spots, a vehicle (or parts of the vehicle) that is also navigating the parking area 308, or signage that may be present in the parking area 308 (that indicates a direction of traffic, a required stop, etc.). The annotated metadata is indicative of these obstacles, hazards, etc. and can be, in particular, indicative of a length, width, area, volume, color, speed, acceleration, or direction of the feature of the parking area. Further, the metadata can be indicative of a path that the autonomous vehicle 302 should take to get to a desired location of the parking area 308 (e.g., an exit, a specific parking spot, etc.).

The supervisory service can be configured to automatically switch (and stitch) the identified one or more video streams, so that the identified one or more video streams encompass video streams that show the autonomous vehicle 302 as well as regions of the parking area 308 that are directly in front (or behind, depending on the direction of travel) of the autonomous vehicle 302. In the example shown in FIG. 3, a video stream of the one or more video streams may be gathered by the drone 326. The supervisory service may change the identified one or more video streams based on optimal angles of views of the streams that are provided to the autonomous vehicle 302. Additionally, the autonomous vehicle 302 (or other mobile devices in the parking area 308) may be configured to opt-in to stream (or upload) video streams gathered by those devices to the supervisory service of the communications network infrastructure 304-306. These streams may include additional metadata such as GPS coordinates, timestamp, direction of video, etc. The supervisory service may be configured to coalesce, store, and reference these streams in case there are events that require retroactive investigation such as crimes, accidents, etc., where audio or video feeds are valuable sources of information.

The supervisory service is configured to then send the annotated one or more video streams (with the metadata) to the autonomous vehicle 302. The supervisory service can send the video streams using any appropriate communications protocols (e.g., Wi-Fi), and need not necessarily be Li-Fi. The autonomous vehicle 302 receives the annotated one or more video streams and can use the metadata of the video streams to avoid the feature of the parking area (that is indicated by the metadata). In particular, the autonomous vehicle 302 may perform at least one of image recognition or mapping processes with the metadata to determine a proximity of the autonomous vehicle 302 in relation to the feature of the parking area. Based on the determined proximity, the autonomous vehicle 302 may avoid the feature (e.g., navigate around it, select a path that is not proximate to the feature, etc.). Further the onboard unit of the autonomous vehicle may combine the received metadata with sensor data that is collected by the autonomous vehicle so as to detect hazards, obstacles, etc. of the parking area 308. Altogether, the autonomous vehicle may use the metadata included in the annotated one or more video streams to augment its situational awareness algorithms and enhance its safety and accuracy.

It is to be understood that the autonomous vehicle 302 may be configured to request the supervisory service to change a position of a camera (that generates a video stream) in situations that provide this ability. For example, the autonomous vehicle may, through the supervisory service, send a pan, tilt, or zoom (PTZ) or move request to a specific camera of the communications network infrastructure 304-306 (or drone 326) or a request for a secondary identification of the feature of the parking area 308.

Figure 4:
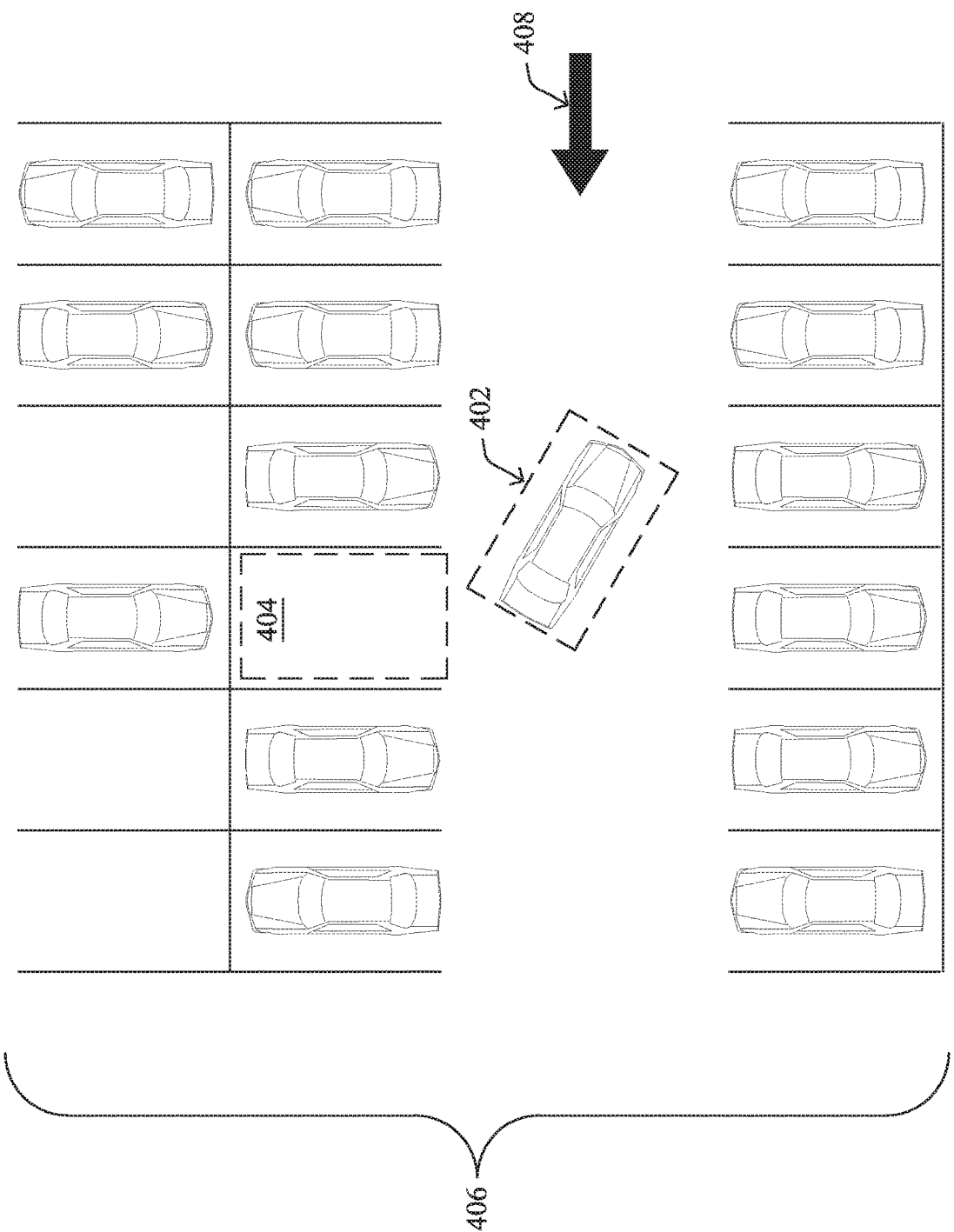
FIG. 4 illustrates additional detail regarding metadata that a supervisory service annotates to one or more video streams.

With reference now to FIG. 4, additional detail regarding the metadata that the supervisory service annotates the one or more video streams is shown. In FIG. 4, the supervisory service has identified that that an autonomous vehicle 402 may be attempting to park in a parking space 404 and is traveling in a region of a parking area 406 that is requires traffic to go one direction, as indicated by a sign 408. The metadata that is annotated to the one or more video streams by the supervisory service can indicate dimensions (e.g., width, length, curb height, etc.) of the parking space 404. Additionally, the metadata can indicate that direction of the sign 408 that corresponds to the directing of traffic of the region of the parking area. Further, the metadata may include information of other vehicles, humans, animals, etc. in the parking area 406, for example, direction, rate of travel, etc. It is to be understood that the supervisory service may identify and include in the metadata identities of the features of the parking area 406. For example, the supervisory service may identify poles, potholes, etc. As examples, the metadata may comprise JavaScript Object Notation or the like (e.g., {'area': '3 m×5 m'; 'free to park': True; 'status': 'vehicle exiting' } for the parking space 404 and {'vehicle': 'compact car'; 'moving': True; 'velocity': '0.3 km/hour'; 'bearing': '160' } for any of the vehicles in the parking area 406). Furthermore, the supervisory service may be configured to include in the metadata navigation directions (e.g., coordinates) for the autonomous vehicle 402 that lead the autonomous vehicle, for example, to the parking space 404. That is, the supervisory may assign a certain "space" of the parking area then indicate a navigation pathway towards the "space," including obstacles to avoid and provide custom/bespoke video stream as it progresses through the parking area.

By receiving both the identified one or more video streams and annotated metadata data, the autonomous vehicle 402 is able to have a much broader "view" of its environment to safely navigate its surroundings. The video streams and metadata may also improve the accuracy of object detection of the autonomous vehicle 402 since the autonomous vehicle 402 might not be as calibrated to detect objects from a specific video angle versus the on-site device that is transmitting the video (via the supervisory service). The on-site device may comprise optimized computer vision algorithms to more accurately detect things in a video stream. This optimization may be leveraged by the autonomous vehicle 402.

Figure 5:
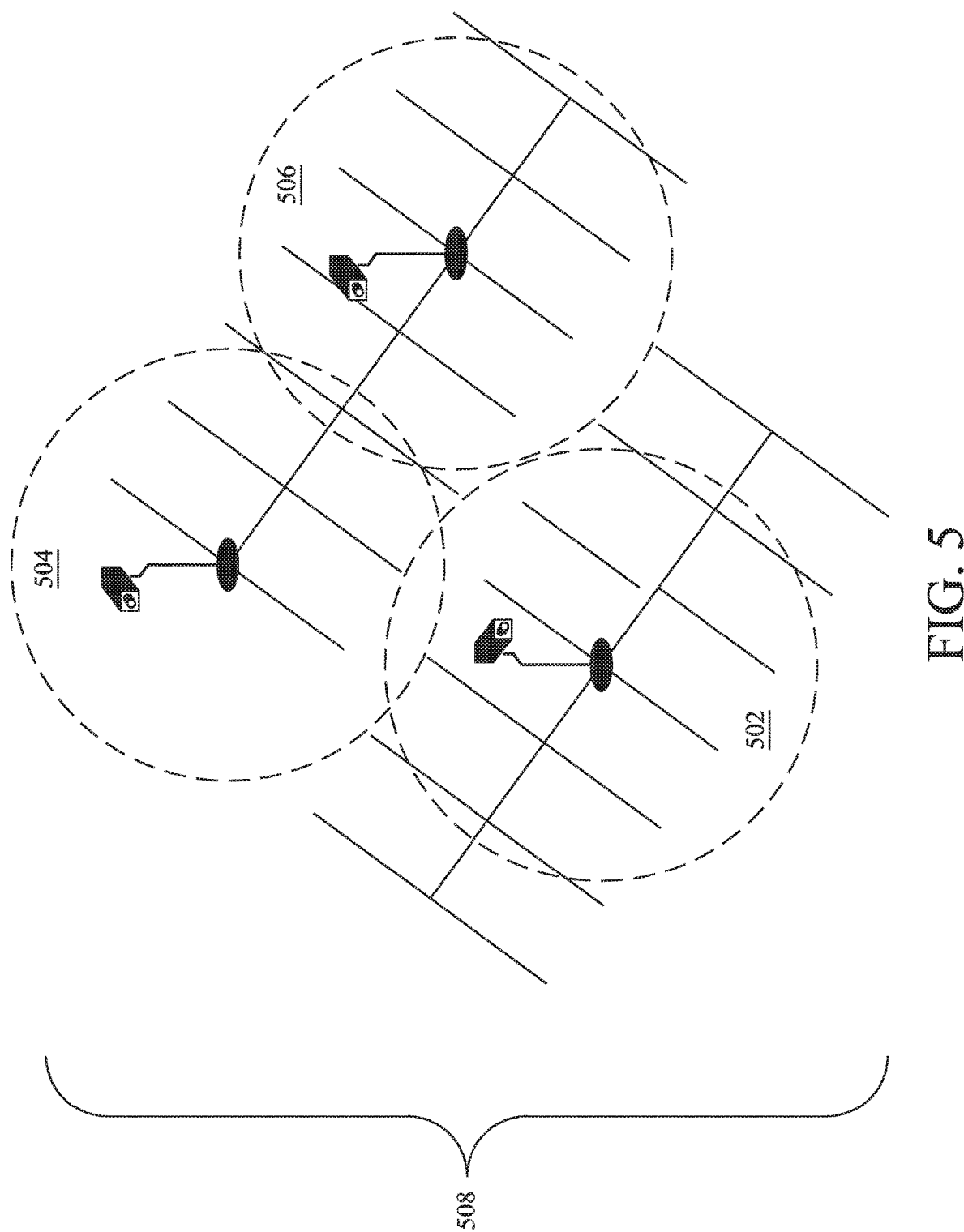
FIG. 5 illustrates stitching of one or more video streams of a parking area.

Turning to FIG. 5, stitching of video streams 502-506 of a parking area 508 is shown. In particular, a supervisory service may be configured to receive the video streams from camera (or image) sensors that are affixed to poles of a parking area 508. The supervisory service may be configured to stitch the video streams 502-506 to generate an individual real-time video stream of the parking area 508. The generated individual stream may be sent to an autonomous vehicle. Alternatively, a segment of the generate individual stream, selected based on a location of the autonomous vehicle, may be sent to the autonomous vehicle.

In an embodiment, the above-described techniques may be applied autonomous drones (e.g., delivery drones), instead of autonomous vehicles, that are navigating a previously unencountered area where there are static sensors available to aid the drone's navigation. The above-described techniques may be applied to supplement the drone's on-board navigation capabilities, by feeding it a "bespoke" video stream (indicating where the drone currently is within that video) and any hazards in proximity to the drone (or within a direction of travel of the drone). Additionally, the above-described techniques may be applied to a drone landing zone to assist in the navigation and tracking for any landing drone.

Figure 6:
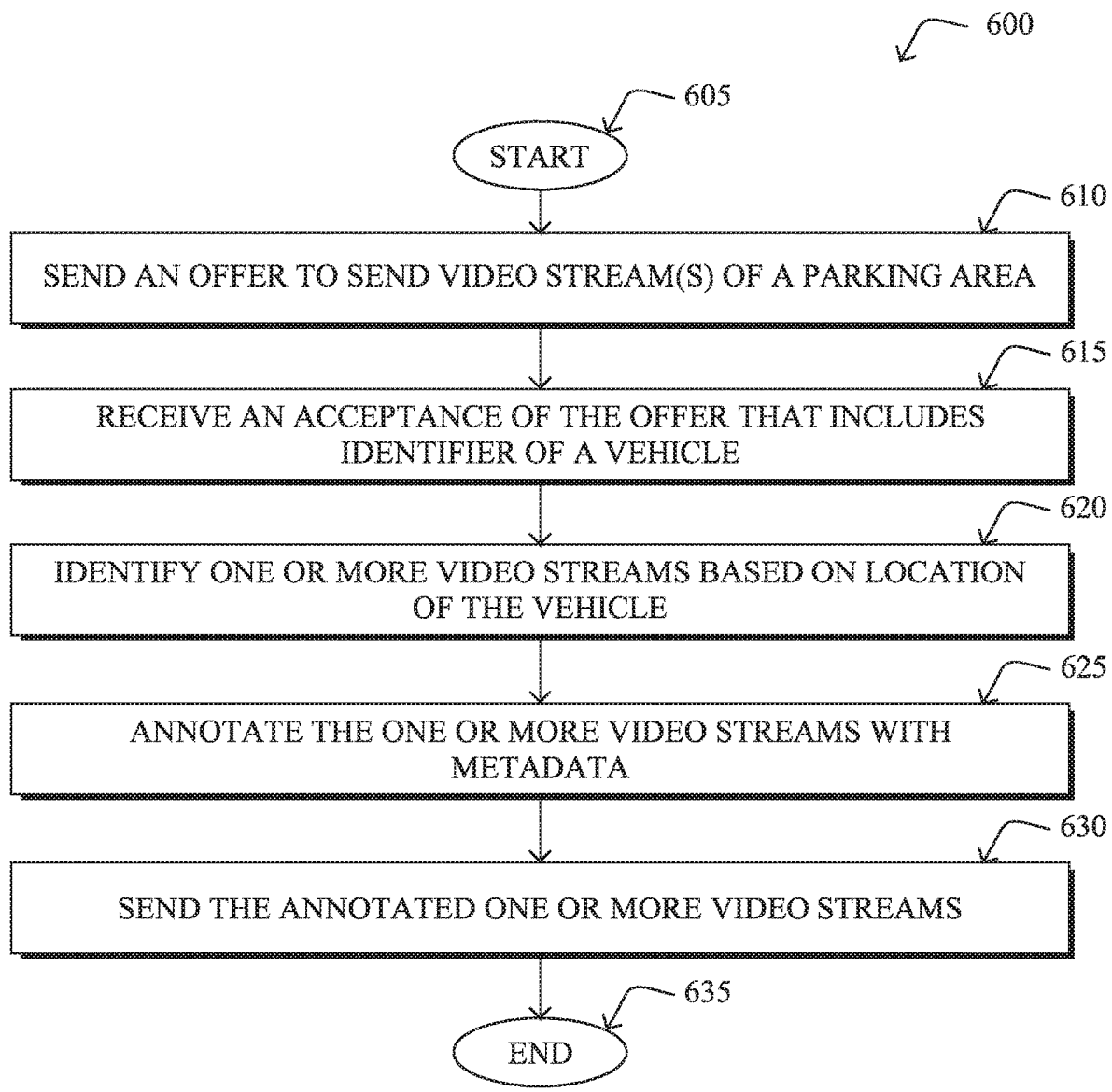
FIGS. 6-7 illustrate example simplified procedures for environment mapping for autonomous vehicles using video stream sharing.
Figure 7:
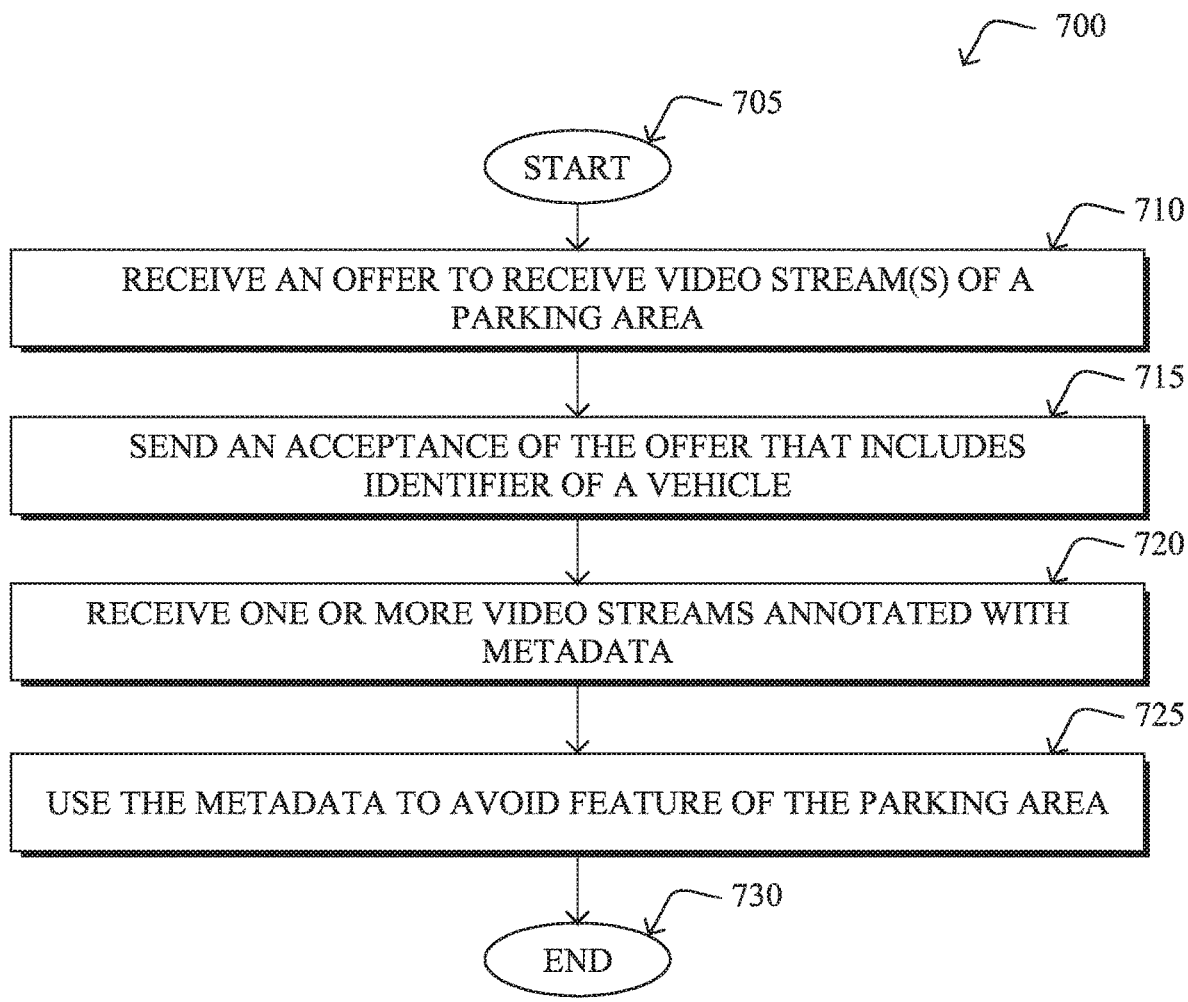

FIGS. 6-7 illustrate example simplified procedures for environment mapping for autonomous vehicles using video stream sharing, in accordance with one or more embodiments described herein. For example, a non-generic, specifically configured device (e.g., device 200) may perform procedures 600-700 by executing stored instructions (e.g., process 248).

With reference to FIG. 6, the procedure 600 may start at step 605, and continues to step 610, where, as described in greater detail above, a device (e.g., device 200) may provide a supervisory service to the infrastructure of the parking area, where the supervisory service may send an offer to send video stream(s) of a parking area. In particular, a supervisory service of a parking area may send a Li-Fi based advertisement indicative of an offer by the supervisory service to send video streams of the parking area to an autonomous vehicle.

At step 615, as described in greater detail above, the device may receive an acceptance of the offer that includes identifier of a vehicle. In particular, the supervisory service may receive an acceptance of the offer by the autonomous vehicle that includes an identifier for the autonomous vehicle. In various embodiments, the acceptance of the offer by the autonomous vehicle that includes the identifier for the autonomous vehicle may be indicated by a pattern in emission of light from headlights of the autonomous vehicle, a Li-Fi transmitter of the autonomous vehicle, a light transmitter of the vehicle, or by infrared emission of the autonomous vehicle At step 620, the device may identify one or more video streams based on location of the vehicle. In particular, the supervisory service may identify one or more video streams of the parking area as associated with the autonomous vehicle based in part on a location of the autonomous vehicle in the parking area. In various embodiments, the supervisory service may use machine learning processes to identify the location of the vehicle within the one or more video streams. Further, a video stream of the one or more video streams may be gathered by a drone, mobile device, camera affixed to the parking area, etc.

At step 625, as detailed above, the device may annotate the one or more video streams with metadata. In particular, the supervisory service may annotate the one or more identified video streams with metadata regarding a feature of the parking area. In various embodiments, the metadata may indicate a length, width, area, volume, color, speed, acceleration, or direction of the feature of the parking area. The feature of the parking area may comprise an occupied parking space, a destination (e.g., unoccupied) parking spot, another vehicle, or signage of a parking area At step 630, as detailed above, the device may send the annotated one or more video streams. In particular, the supervisory service may send the annotated one or more video streams to the autonomous vehicle, wherein the autonomous vehicle uses the metadata of the annotated one or more video streams to avoid the feature of the parking area. In various embodiments, the autonomous vehicle may combine the metadata with sensor data that is collected by the autonomous vehicle. Further, the autonomous vehicle may perform at least one of image recognition or mapping processes with the metadata to determine a proximity of the autonomous vehicle in relation to the feature of the parking area. Procedure 600 then ends at step 635.

With reference to FIG. 7, the procedure 700 may start at step 705, and continues to step 710, where, as described in greater detail above, a device (e.g., device 200) operating on an autonomous vehicle, where the autonomous vehicle may receive an offer to receive video stream(s) of a parking area. In particular, an autonomous vehicle may receive a Li-Fi based advertisement indicative of an offer by a supervisory service to send video streams of the parking area to the vehicle from the supervisory service. In various embodiments, At step 715, as described in greater detail above, the device may send an acceptance of the offer that includes identifier of a vehicle. In particular, autonomous vehicle may send an acceptance of the offer by the autonomous vehicle that includes an identifier for the autonomous vehicle. In various embodiments, the acceptance of the offer by the autonomous vehicle that includes the identifier for the autonomous vehicle may be indicated by a pattern in emission of light from headlights of the autonomous vehicle, a Li-Fi transmitter of the autonomous vehicle, a light transmitter of the vehicle, or by infrared emission of the autonomous vehicle At step 720, the device may receive one or more video streams annotated with metadata. In particular, the autonomous vehicle may receive one or more video streams annotated with metadata regarding a feature of the parking area, wherein the supervisory service identifies the annotated one or more video streams based in part on a location of the autonomous vehicle in the parking area and annotates the annotated one or more video streams with metadata regarding the feature of the parking area. In various embodiments, the metadata may indicate a length, width, area, volume, color, speed, acceleration, or direction of the feature of the parking area. The feature of the parking area may comprise an occupied parking space, a destination (e.g., unoccupied) parking spot, another vehicle, or signage of a parking area At step 725, as detailed above, the device may use the metadata to avoid feature of the parking area. In particular, the supervisory service may use the metadata of the annotated one or more video streams to avoid the feature of the parking area. In various embodiments, the autonomous vehicle may combine the metadata with sensor data that is collected by the autonomous vehicle. Further, the autonomous vehicle may perform at least one of image recognition or mapping processes with the metadata to determine a proximity of the autonomous vehicle in relation to the feature of the parking area. Procedure 700 then ends at step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for video stream annotating and sharing operations for environment mapping for connected vehicles, such as automobiles, trains, planes, boats, or the like, or even certain non-vehicle devices. In some aspects, the techniques herein leverage machine learning, to select one or more video streams to annotate and send to an autonomous vehicle. By leveraging the video stream annotating and sharing operations, the techniques herein allow for infrastructure to send a "bespoke" video stream (or streams), annotated with metadata indicative of a feature of the parking area (e.g., an obstacle, signage, etc.) to the autonomous vehicle. The autonomous vehicle may use the metadata to identify the feature and avoid it.

While there have been shown and described illustrative embodiments that provide for annotating and sending video streams to an autonomous vehicle, it is to be understood that various other adaptations and modifications may be made within the intention and scope of the embodiments herein. For example, while certain embodiments are described herein with respect to using certain models for purposes of selecting one or more video streams, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intention and scope of the embodiments herein.

What is claimed is:

1. A method, comprising:
   sending, by a supervisory service of a parking area and to an autonomous vehicle, a light fidelity (Li-Fi) based advertisement indicative of an offer by the supervisory service to send video streams of the parking area to the autonomous vehicle;
   receiving, at the supervisory service, an acceptance of the offer by the autonomous vehicle that includes an identifier for the autonomous vehicle;
   identifying, by the supervisory service, one or more video streams among a plurality of video streams of the parking area as associated with the autonomous vehicle using the identifier for the autonomous vehicle to locate the autonomous vehicle in the one or more identified video streams;
   annotating, by the supervisory service, the one or more identified video streams with metadata regarding a feature of the parking area; and
   sending, by the supervisory service, the annotated one or more video streams to the autonomous vehicle, wherein the autonomous vehicle uses the metadata of the annotated one or more video streams to avoid the feature of the parking area.

2. The method of claim 1, wherein the acceptance of the offer by the autonomous vehicle that includes the identifier for the autonomous vehicle is indicated by a pattern in emission of light from headlights of the autonomous vehicle, a Li-Fi transmitter of the autonomous vehicle, a light transmitter of the vehicle, or by infrared emission of the autonomous vehicle.

3. The method of claim 1, wherein the metadata indicates a length, width, area, volume, color, speed, acceleration, or direction of the feature of the parking area.

4. The method of claim 1, wherein using, by the autonomous vehicle, the metadata of the annotated one or more video streams to avoid the feature of the parking area comprises:
   performing, by the autonomous vehicle, at least one of image recognition or mapping processes with the metadata to determine a proximity of the autonomous vehicle in relation to the feature of the parking area.

5. The method of claim 1, wherein using, by the autonomous vehicle, the metadata of annotated one or more video streams to avoid the feature of the parking area:
   combining, by the autonomous vehicle, the metadata with sensor data that is collected by the autonomous vehicle.

6. The method of claim 1, wherein the metadata regarding the feature of the parking area is indicative of an occupied parking space or a destination parking spot, further wherein the autonomous vehicle avoids the occupied parking space.

7. The method of claim 1, wherein the metadata regarding the feature of the parking area is indicative of another vehicle in the parking area, further wherein the autonomous vehicle avoids the other vehicle.

8. The method of claim 1, wherein the metadata regarding the feature of the parking area is indicative of signage in the parking area, further wherein the autonomous vehicle avoids traveling in a direction different than indicated by the signage.

9. The method of claim 1, wherein a video stream of the video streams is collected by a camera of a drone.

10. A method, comprising:
    receiving, by an autonomous vehicle and from a supervisory service of a parking area, a light fidelity (Li-Fi) based advertisement indicative of an offer by the supervisory service to send video streams of the parking area to the vehicle;
    sending, by the autonomous vehicle, an acceptance of the offer by the autonomous vehicle that includes an identifier for the autonomous vehicle;
    receiving, by the autonomous vehicle, one or more video streams annotated with metadata regarding a feature of the parking area, wherein the supervisory service identifies the annotated one or more video streams among a plurality of video streams of the parking area using the identifier for the autonomous vehicle to locate the autonomous vehicle in the one or more video streams and annotates the one or more video streams with metadata regarding the feature of the parking area; and using, by the autonomous vehicle, the metadata of the annotated one or more video streams to avoid the feature of the parking.

11. The method of claim 10, wherein the acceptance of the offer by the autonomous vehicle that includes the identifier for the autonomous vehicle is indicated by a pattern in emission of light from headlights of the autonomous vehicle, a Li-Fi transmitter of the autonomous vehicle, a light transmitter of the vehicle, or by infrared emission of the autonomous vehicle.

12. The method of claim 10, wherein the metadata indicates a length, width, area, volume, color, speed, acceleration, or direction of the feature of the parking area.

13. The method of claim 10, wherein using, by the autonomous vehicle, the metadata of the annotated one or more video streams to avoid the feature of the parking area comprises:

performing, by the autonomous vehicle, at least one of image recognition or mapping processes with the metadata to determine a proximity of the autonomous vehicle in relation to the feature of the parking area.

14. The method of claim 10, wherein using, by the autonomous vehicle, the metadata of annotated one or more video streams to avoid the feature of the parking area:

combining, by the autonomous vehicle, the metadata with sensor data that is collected by the autonomous vehicle.

15. The method of claim 10, wherein the metadata regarding the feature of the parking area is indicative of an occupied parking space or a destination parking spot, further wherein the autonomous vehicle avoids the occupied parking space.

16. The method of claim 10, wherein the metadata regarding the feature of the parking area is indicative of another vehicle in the parking area, further wherein the autonomous vehicle avoids the other vehicle.

17. The method of claim 10, wherein the metadata regarding the feature of the parking area is indicative of signage in the parking area, further wherein the autonomous vehicle avoids traveling in a direction different than indicated by the signage.

18. The method of claim 10, wherein a video stream of the video streams is collected by a camera of a drone.

19. An apparatus, comprising:

one or more network interfaces to communicate with a network;

a processor coupled to the network interfaces and configured to execute one or more processes; and a memory configured to store a process executable by the processor, the process when executed configured to:

send a light fidelity (Li-Fi) based advertisement indicative of an offer by a supervisory service of a parking area to send video streams of the parking area to an autonomous vehicle;

receive an acceptance of the offer by the autonomous vehicle that includes an identifier for the autonomous vehicle;

identify one or more video streams among a plurality of video streams of the parking area as associated with the autonomous vehicle using the identifier for the autonomous vehicle to locate the autonomous vehicle in the one or more identified video streams;

annotate the one or more identified video streams with metadata regarding a feature of the parking area; and send the annotated one or more video streams to the autonomous vehicle, wherein the autonomous vehicle uses the metadata of the annotated one or more video streams to avoid the feature of the parking area.

20. The apparatus as in claim 19, wherein the acceptance of the offer by the autonomous vehicle that includes the identifier for the autonomous vehicle is indicated by a pattern in emission of light from headlights of the autonomous vehicle, a Li-Fi transmitter of the autonomous vehicle, a light transmitter of the vehicle, or by infrared emission of the autonomous vehicle.

* * * * *